United States Patent
Robinson (10) Patent No.: US 7,434,823 B2
(45) Date of Patent: Oct. 14, 2008

(54) SUSPENSION SYSTEM FOR VEHICLES

(76) Inventor: Edwin Robinson, Lista Correos, E-03410 Biar (Alicante) (ES)

(*) Notice: Subject to any disclaimer, the term of this patent is extended or adjusted under 35 U.S.C. 154(b) by 532 days.

(21) Appl. No.: 10/515,513

(22) PCT Filed: May 22, 2003

(86) PCT No.: PCT/GB03/02230

§ 371 (c)(1),
(2), (4) Date: Jun. 13, 2005

(87) PCT Pub. No.: WO03/099645

PCT Pub. Date: Dec. 4, 2003

(65) Prior Publication Data

US 2005/0230170 A1 Oct. 20, 2005

(30) Foreign Application Priority Data

May 23, 2002 (GB) .................................. 0211839.6

(51) Int. Cl.
*B60G 7/00* (2006.01)
*B60G 3/00* (2006.01)

(52) U.S. Cl. .................... 280/124.153; 280/124.134; 280/279

(58) Field of Classification Search .......... 280/124.134, 280/124.135, 124.138, 276, 277, 279, 124.153
See application file for complete search history.

(56) References Cited

U.S. PATENT DOCUMENTS

| 2,082,620 | A | * | 6/1937 | Ellefsen | ....................... 267/230 |
| 6,164,675 | A | * | 12/2000 | Pickering | .................... 280/277 |
| 6,382,374 | B1 | * | 5/2002 | Iwai et al. | ................... 188/345 |
| 6,488,300 | B2 | * | 12/2002 | Ito et al. | ..................... 280/276 |
| 2001/0019197 | A1 | * | 9/2001 | Ito et al. | ..................... 280/276 |
| 2005/0236797 | A1 | * | 10/2005 | Deal et al. | ............ 280/124.135 |

* cited by examiner

*Primary Examiner*—Lesley D. Morris
*Assistant Examiner*—Barry Gooden, Jr.
(74) *Attorney, Agent, or Firm*—Jack Schwartz & Associates, PLLC (57) ABSTRACT

A suspension arrangement for the wheels of vehicles comprising links (1 & 2), of equal pivotal length rotatably attached to the chassis or body at one end, at upper and lower chassis attachment points (3 & 4), and an axle support link (7), locating a wheel axle (8), at one end and attached at its other ends (5 & 6) to the opposite ends of the links (1 & 2). The spacing between attachments (3 & 4) is double that between (5 & 6) and the centre distance between the axle and its link attachment points is the same as the pivotal length of links (1 & 2). The geometry of said arrangement constrains the movement of the axle/wheel rectilinearly between the chassis attachment points and the angular displacement of the axle support link focuses to an axis (10), exhibiting slight rectilinear displacement.

12 Claims, 7 Drawing Sheets

SUSPENSION SYSTEM FOR VEHICLES

This invention relates to vehicle axle suspension systems.

Suspension systems for vehicles are well known and comprise a means for attachment of the wheels to the chassis or body including springs and dampers. The arrangement allows substantially vertical displacement of the wheels, e.g. whilst negotiating bumps, such as to cause minimal disturbance to the vehicle body and its contents and where necessary a means for turning the wheels to steer the vehicle.

Hitherto various means have been used to allow independent movement of each wheel in the vertical plane to retain maximum tyre contact with the road when negotiating bumps and corners and to maintain control of displacement around the vertical and horizontal axis that might adversely affect the handling of the vehicle. A combination of e.g. MacPherson struts, lower links, torsion bars, double wishbones, radial arms, trailing arms and beam axles are typical well known examples of such systems.

Suspension systems for single track vehicles such as for the front wheel of a motorcycle are also well known and come in various designs with registered trade marks such as e.g. Norton 'Road Holder' telescopic forks, Vincent 'Girdraulic', Ohlin 'Upside-down' telescopic forks, BMW 'Telelever' forks, Earls leading link forks, Ariel trailing link forks, etc.

There are many problems to solve in the design of suspension systems and the foregoing types, combined with respective castor, rake, trail, camber, toe-in or toe-out settings, can achieve an acceptable compromise in handling and control.

More specifically a suspension system soft enough to absorb disturbances and produce a satisfactory ride has problems dealing with dive and squat on retardation or acceleration of the vehicle. Hard application of the brakes results in severe dive of the front end due to weight transfer, leaving very little travel to absorb bumps with high preload in the springs. This temporarily causes considerable discomfort to the passengers due to the changes in the characteristics of the suspension. Therefore whilst anti-dive and anti-squat systems may be desirable features they can compromise ride and add to manufacturing costs.

The increased level in performance of modern vehicles and tyres have made the problems more acute and in the case of single-track vehicles such as motorcycles, even more so because the bike must lean over when negotiating bends to counteract centrifugal force. The angle of inclination increases with velocity or the bend radius and when negotiating bumps, deflection and twisting of the wheels and chassis can occur, which upsets the handling and control of the vehicle. During high speed cornering, rotating parts such as the wheels and engine flywheel set up individual gyroscopic precessions which adversely affect the handling, particularly when changing direction through a series of bumpy bends, where sudden deflections of the front wheel/forks can induce a severe wobble, causing the rider to lose control.

In the majority of designs suitable for motorcycles, the lower part of the forks, springs, dampers, brake callipers and wheels, all move at the same velocity and this unsprung mass has a relatively high momentum when the vehicle is travelling over bumps at speed. The forces generated can cause severe stress and difficulty of control, requiring careful choice of suspension characteristics and it is well known that reductions in the unsprung weight are beneficial, provided that they do not compromise strength or rigidity of the forks.

In many designs service life is affected by premature wear of the sliding surfaces, which increases under braking loads and is accelerated by dirt adhering to the exposed mating elements.

The foregoing factors affect the ability of telescopic forks to maintain wheel alignment during rectilinear motion, because clearances between the sliding elements render them less rigid and frictional forces may be unequal. Therefore the strength and rigidity of the forks, the axle and its clamping arrangement, must be increased to prevent unsynchronised movement of the sliders and this inevitably adds to the unsprung weight.

Similarly leading or trailing link forks require a loop or bridge element to provide the strength to maintain wheel alignment. This adds to the unsprung weight and because these generally move at the same velocity as the wheel, the momentum also.

Girder forks also suffer in this respect and have the additional problem of inducing high stresses in their attachment bearings, which are a relatively long way from the point of application of the loads. Whilst the forks themselves are relatively strong, sideways deflection occurs readily with wear in the attachment bearings.

According to the present invention there is provided a suspension arrangement for the wheels of vehicles comprising upper and lower links of equal pivotal length displaced from each other and rotatably attached to the chassis or body at one end at upper and lower chassis attachment points separated by a first spacing and an axle support link locating a wheel axle at one end and attached to the opposite ends of the upper and lower links at its other end by attachment points separated by a second spacing, in which the first spacing is double the second spacing, and the centre distance between the axle and the link attachment points is the same as the pivotal length of the upper and lower links, such that the geometry of said arrangement constrains the movement of the axle/wheel rectilinearly between the chassis attachment points and the angular displacement of the axle support link focuses to an axis or centre point exhibiting slight rectilinear displacement at 90° to that of the wheel.

A specific embodiment of the invention positions a transverse torsion bar with its centre of rotation on the stationary axis or focal point of the axle support link and which is liked to the axle to provide additional lateral stability. A disc brake calliper is positioned on the axle support link to limit dive and compact spring and damper systems acting around the torsion bar minimise unsprung weight. The torsion bar also communicates between the wheels on opposite sides of the vehicle, limiting roll.

In the case of single-track vehicles, e.g. motorcycles or cycles, a combination of links, torsion bar(s), suspension devices and dampers working in unison, provides an extremely rigid and relatively light solution for resisting deflections of the axle/wheel, particularly when negotiating corners at high speed, thus improving stability and control when encountering bumps.

Further advantages include: The stiffness and strength of the forks and supporting elements used in single-track vehicles, is greater weight for weight than is possible with a telescopic fork and wear of moving parts is reduced, because sliding friction under load is substantially eliminated by the use of proprietary sealed bearings at the pivots, which keep out dirt and are economical to replace.

The invention will now be described by reference to the accompanying drawings in which.

Figure 1:
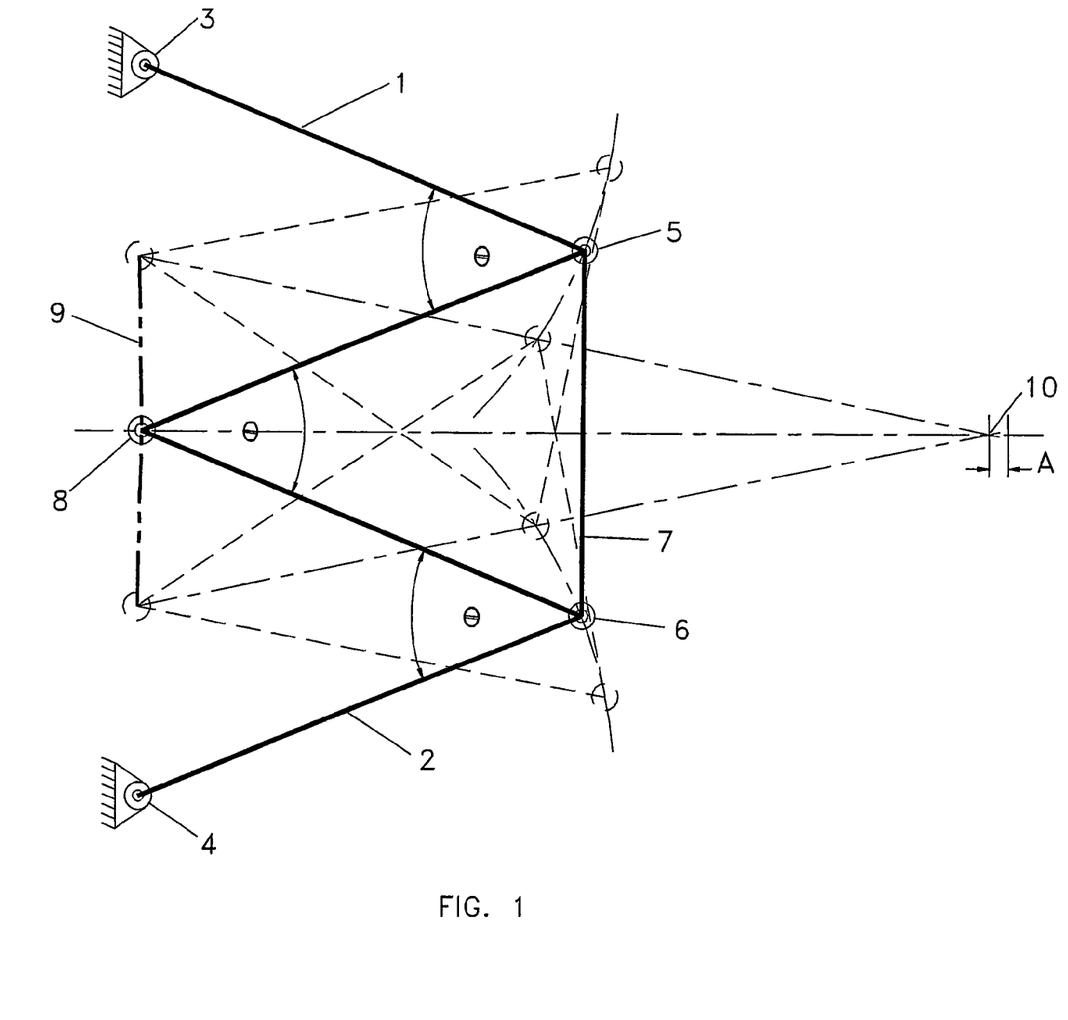
FIG. 1. Is a simplified drawing showing the geometric arrangement of links and loci of motion.

Referring to FIG. 1. The links 1 and 2 are connected to substantially rigid attachments 3 and 4 located on the vehicle body or chassis using proprietary bearings, not shown, and at the opposite ends thereof 5 and 6 to triangulated link 7 by similar means. The wheel axle 8 is located at the other end of link 7 and describes a substantially straight-line motion indicated by locus 9 on articulation of the links 1, 2 and 7. Centre lines drawn through axle 8 from various positions on locus 9 and equidistant between points 5 and 6 intersect at point 10 when extended. The latter exhibits relatively short rectilinear motion designated by the letter 'A', at ninety degrees to that of the wheel axle 8 and the included angles θ, with the linkage at mid position are all equal.

Figure 2:
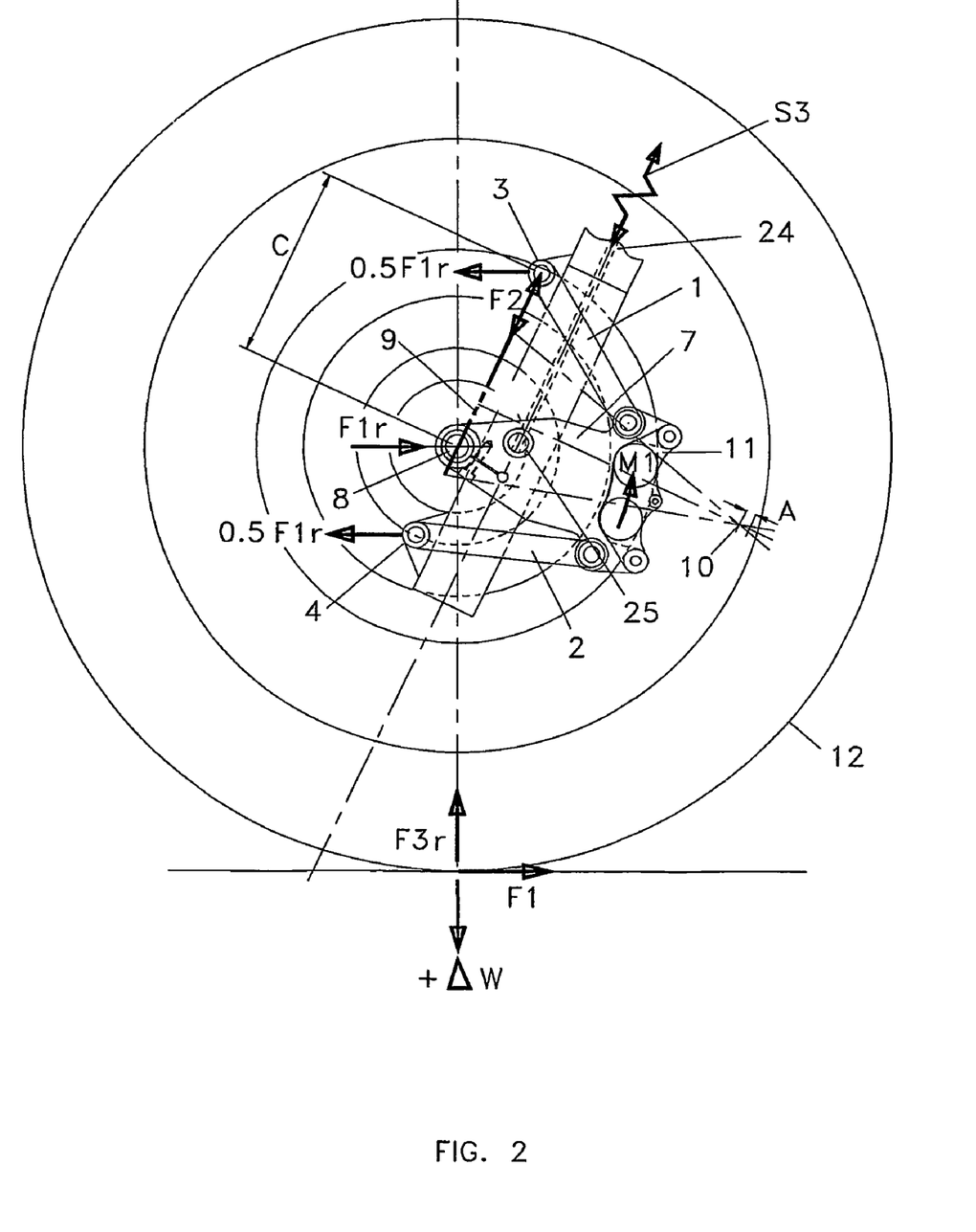
FIG. 2. Shows an arrangement with typical reactions during retardation of the vehicle.

Referring to FIG. 2. Which shows a specific embodiment of the invention applied to the front wheel of a vehicle. The link 7 is shown with brake calliper 11 positioned at a predetermined radius from the centre of the axle 8. On application of the brakes the moment due to M1 about the axle produces retardation force F1 at the road surface to slow the vehicle and the force F2 via the linkage, which tries to increase the distance C and raise the front end of the vehicle. The inertia of the vehicle resisting retardation acts through its centre of gravity resulting in weight transfer ΔW to the front wheel 12. This additional load is equivalent to the rate of deceleration, the height of the centre of gravity and its position between the front and rear wheels, producing upward and opposite reaction F3r. The inertia also produces horizontal opposing reactions equivalent to 0.5 F1 at each of the attachment points 3 and 4 and reaction F1r horizontally via the axle 8 and links 1 and 2, which cause the axle 8 to move towards the mid position of locus 9. The combined reactions F3r and F1r, oppose F2 and the forces tend to be in balance at mid-travel of the suspension. Selection of the optimum geometry for wheel travel along locus 9 together with the correct link proportions and position for the brake calliper relative to focal point 10, will produce the desired control of vehicle ride height under retardation conditions without compromising the suspension characteristics S3, applied in this example via items 24 and 25 to link 7.

Figure 3:
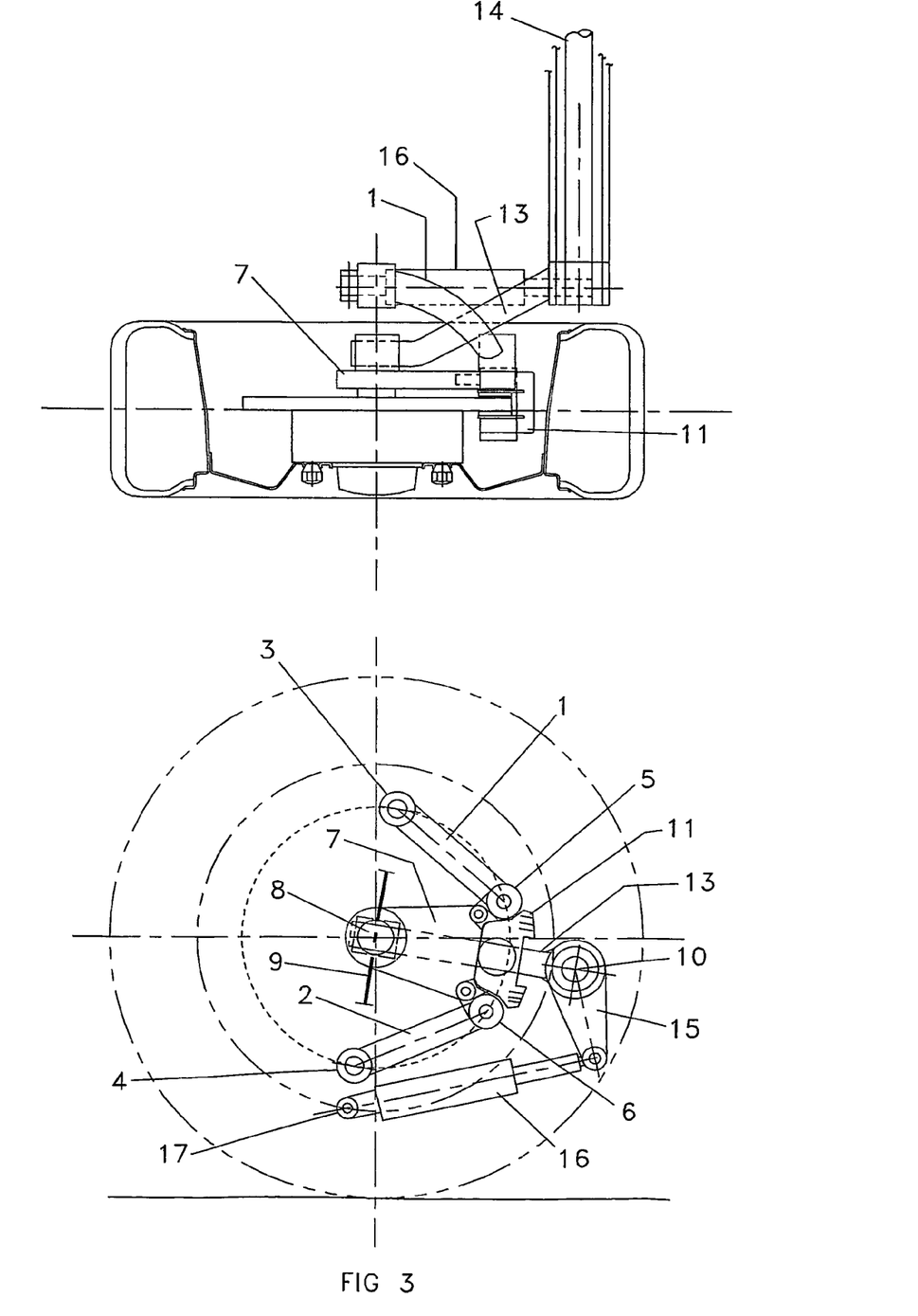
FIG. 3. Is a typical arrangement of a vehicle rear wheel suspension system at mid-travel.

Referring to FIG. 3. The views are of a typical vehicle rear wheel assembly at mid stroke, wherein links 1 and 2 are rotatably attached to the vehicle body or chassis at points 3 and 4 and similarly at the other ends 5 and 6 to link 7. Axle 8 is attached at the opposite end of the link 7 and disc brake caliper 11 is located thereon. Link 13 of torsion bar 14 is compliantly attached to link 7 near axle 8, to provide additional lateral rigidity and allow for slight variations in the radial displacement between link 7 and the torsion bar 14 as the wheel travels along locus 9. The torsion bar 14 is located at the coincident centre point 10 described in FIG. 1. Lever arm 15 operates one end of strut 16 whist the opposite end of the strut is attached to the body at 17. The assembly may be replicated at the opposite side of e.g. a car, and may be mounted on a sub-frame (not shown) to form the suspension and axle arrangement for the rear wheels of a vehicle.

Figure 4:
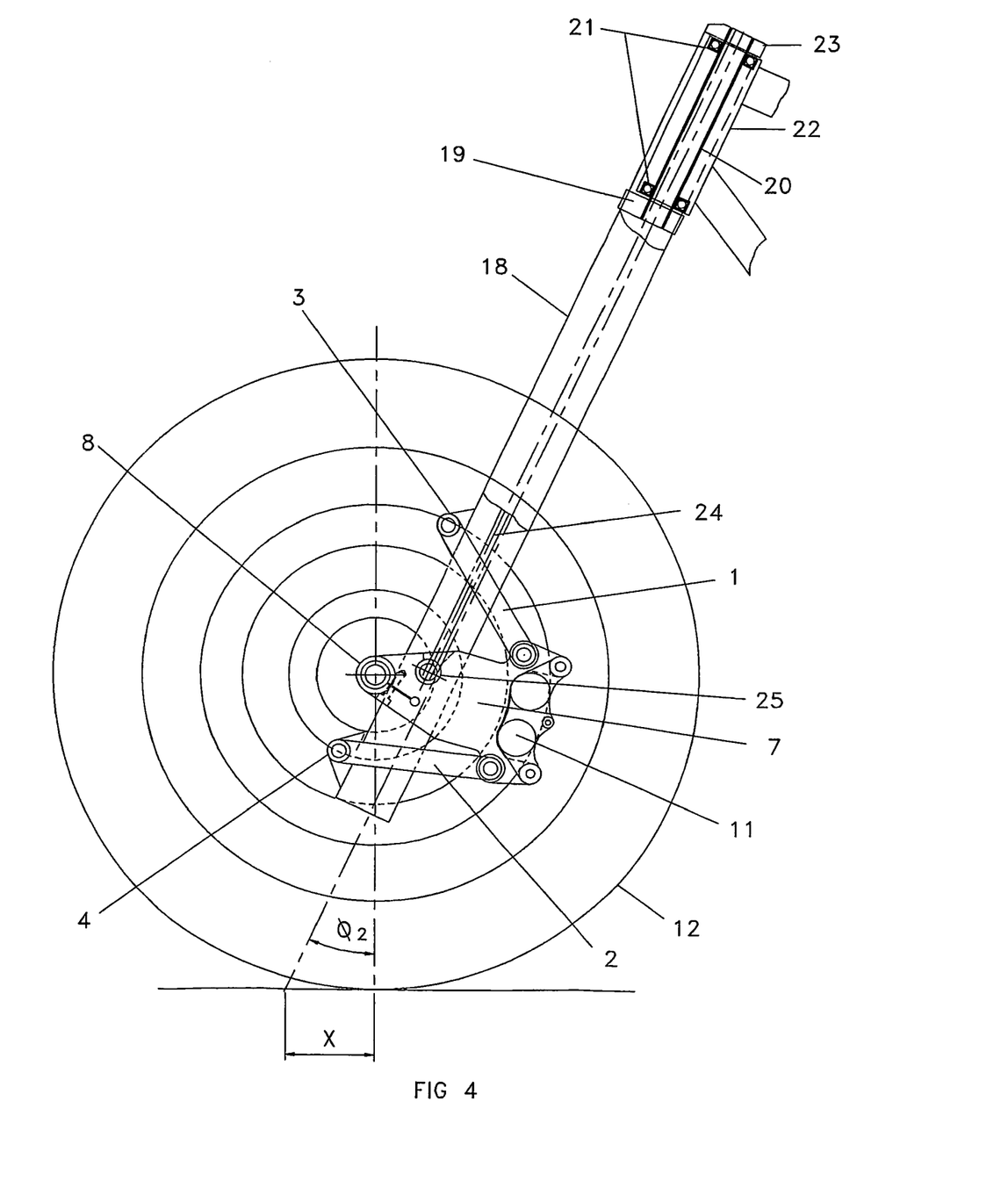
FIG. 4. Is a side elevation on the front forks and wheel of a motorcycle.

Referring to FIG. 4. Which shows an arrangement suitable for the front wheel of a motorcycle. Leg 18 is joined by yolk 19 to pillar 20 that passes through bearings 21 located in the steering head tube 22 that is part of the chassis of a motorcycle, not shown Yolk 23 completes the attachment of the fork to the vehicle and the axis is inclined to provide trail X and rake θ₂ suitable for steering the vehicle. The fork leg 18 is provided with attachment points 3 and 4 and trailing links 1 and 2 are rotatably connected thereto and similarly at their opposite ends to the leading link 7 using proprietary bearings and seals not shown. The leading links may pass through or around the leg 18 in such a way as to provide lateral support for axle 8 of front wheel 12 and link 7 may have brake calliper 11 appended thereto. Item 24 is pivotally connected to leading link 7 at point 25 and at its opposite end to springs with two-way dampers located on or within the leg 18 but not shown. The arrangement may be duplicated on either side of the wheel and steering head for additional support/control.

Figures 5, 6:
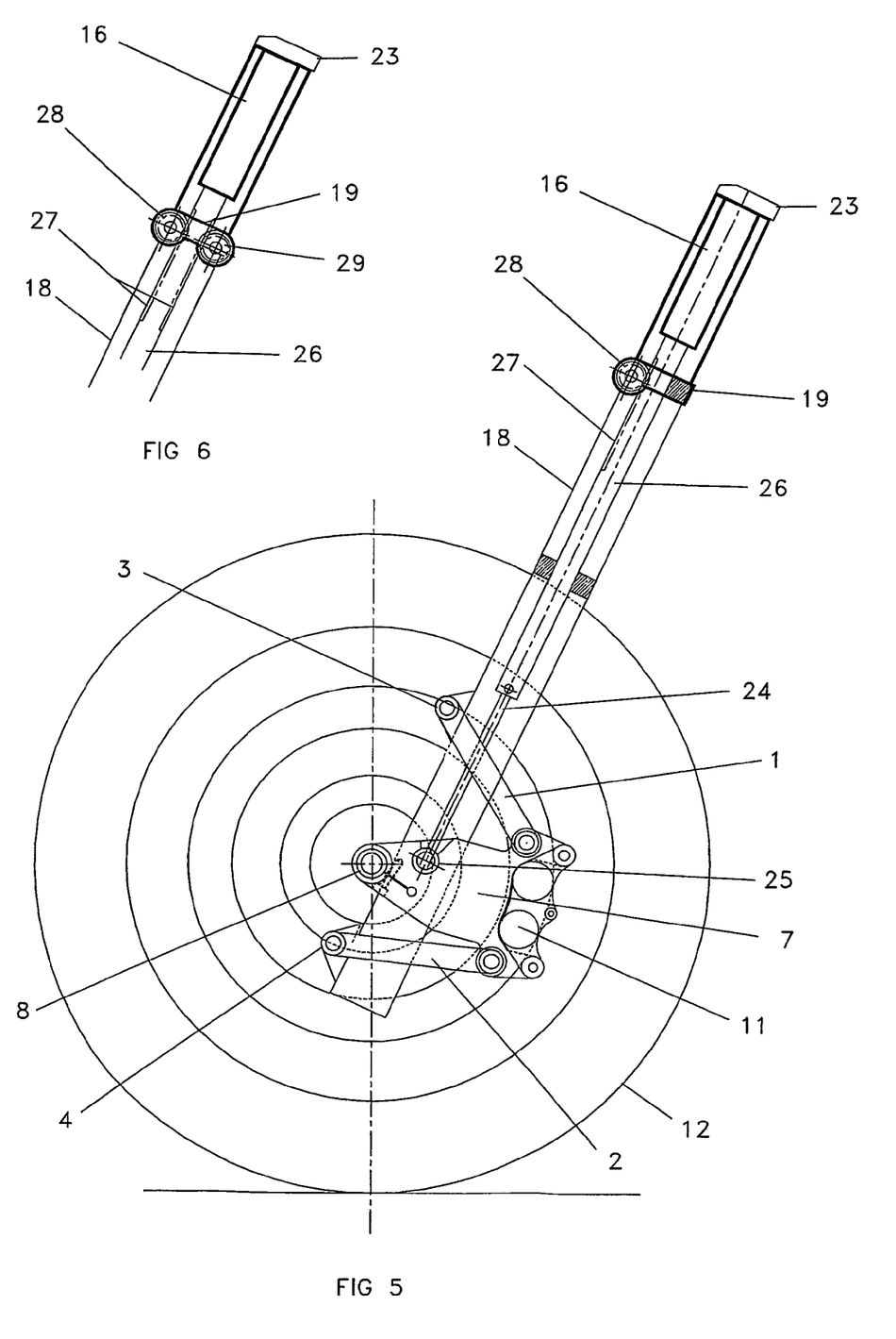
FIGS. 5 & 6. Are side elevations showing geared torsion bar(s) within the front forks.

Referring to FIG. 5. Which is a sectional elevation of one fork leg. Item 24 is pivotally connected to leading link 7 at point 25 and passes coaxially inside the leg 18 whereupon it is rotatably connected to member 26 which has a geared rack 27 meshing with a torsion bar 28 housed within yolk 19 and located by bearings at either end, not shown An identical fork leg, not shown, is positioned by yolks 19 and 23 at the other side of wheel 12 and parallel to leg 18 with axle 8 attached by a similar arrangement of links. The yolks 19 and 23 may be connected to a vehicle by pillar 20 and bearings 21, not shown, to provide a means for steering a vehicle. As the wheel 12 moves up or down when travelling over bumps, the axis of the axle 8 and the torsion bar 28 are constrained to remain parallel to each other by the geared rack and torsion bar and any lateral load trying to deflect the wheel will be strongly resisted.

FIG. 6. Shows the upper section of a similar arrangement to that in FIG. 5 with two geared torsion bars 28 and 29 meshing with members 26 to provide additional constraint and maintain axle/wheel alignment.

Figure 7:
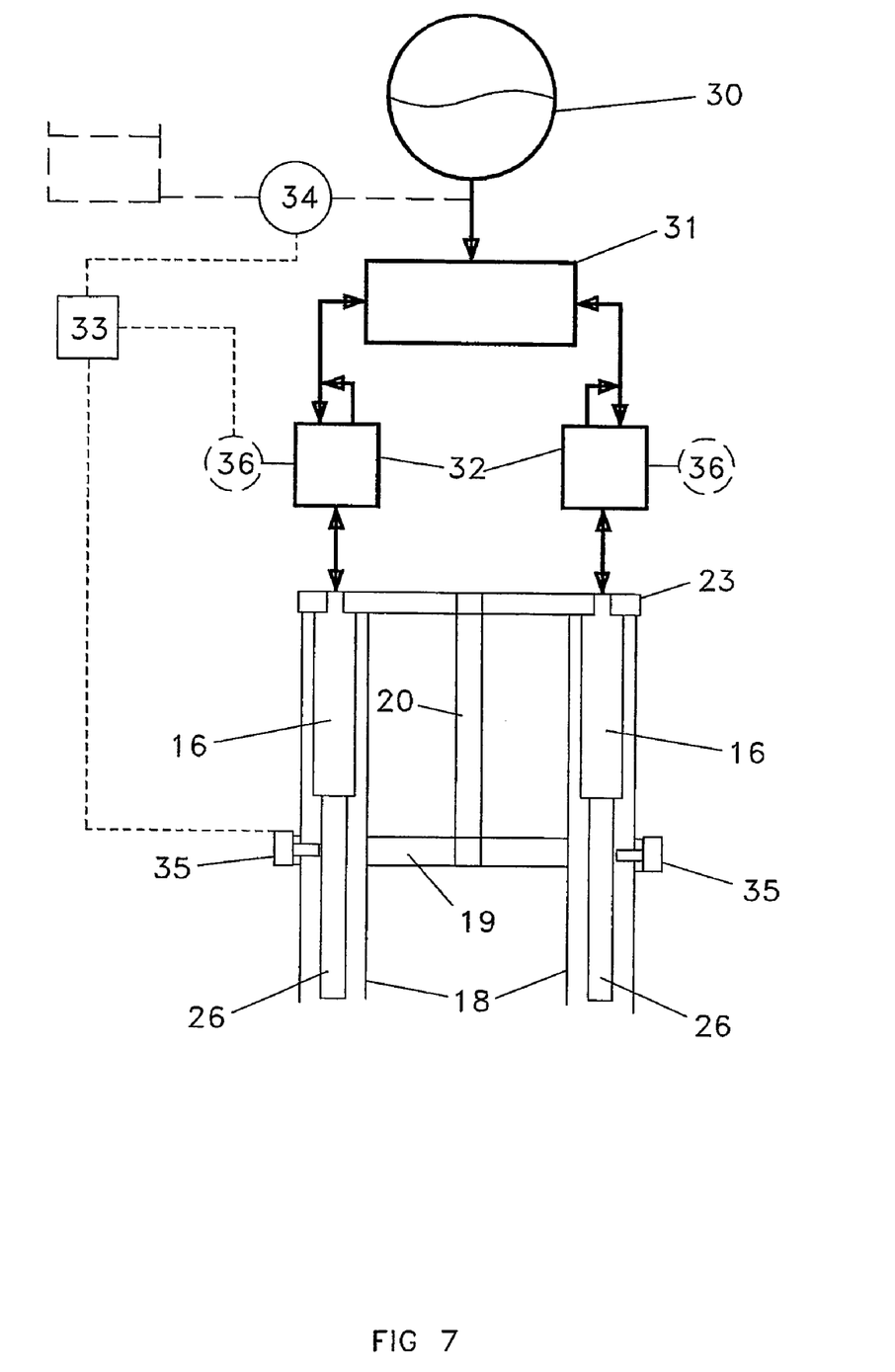
FIGS. 7 & 8. Are diagrammatic arrangements with controlled hydraulic suspension.

Referring to FIG. 7. This is a diagram representing a suspension system similar to those described in FIGS. 4, 5 and 6, but not limited thereto. It includes hydraulic struts 16 mounted within fork legs 18 secured by yolks 19 and 23, so that the assembly can pivot around pillar 20 mounted in bearings 21, not shown, for steering purposes. Struts 16 are connected to a gas/oil pressurised accumulator 30, via a 50:50 flow divider/re-combiner 31, and adjustable bump and rebound dampers 32. In this arrangement the struts 16 are constrained to work in unison regardless of the load or pressure on them by item 31 and/or items 32 and 35. The accumulator 30 can be used to vary the spring rating via adjustment of the pressure, which may be done manually, or automatically using load sensors not shown, a CPU 33 and a pump 34. The bump and rebound damping can also be adjusted externally using dampers 32, either manually or automatically using e.g. velocity/position sensors 35 to monitor the motion of items 26 with feed back via the CPU 33 to control servo motors 36 which adjust the damping and/or flow rate accordingly.

Figure 8:
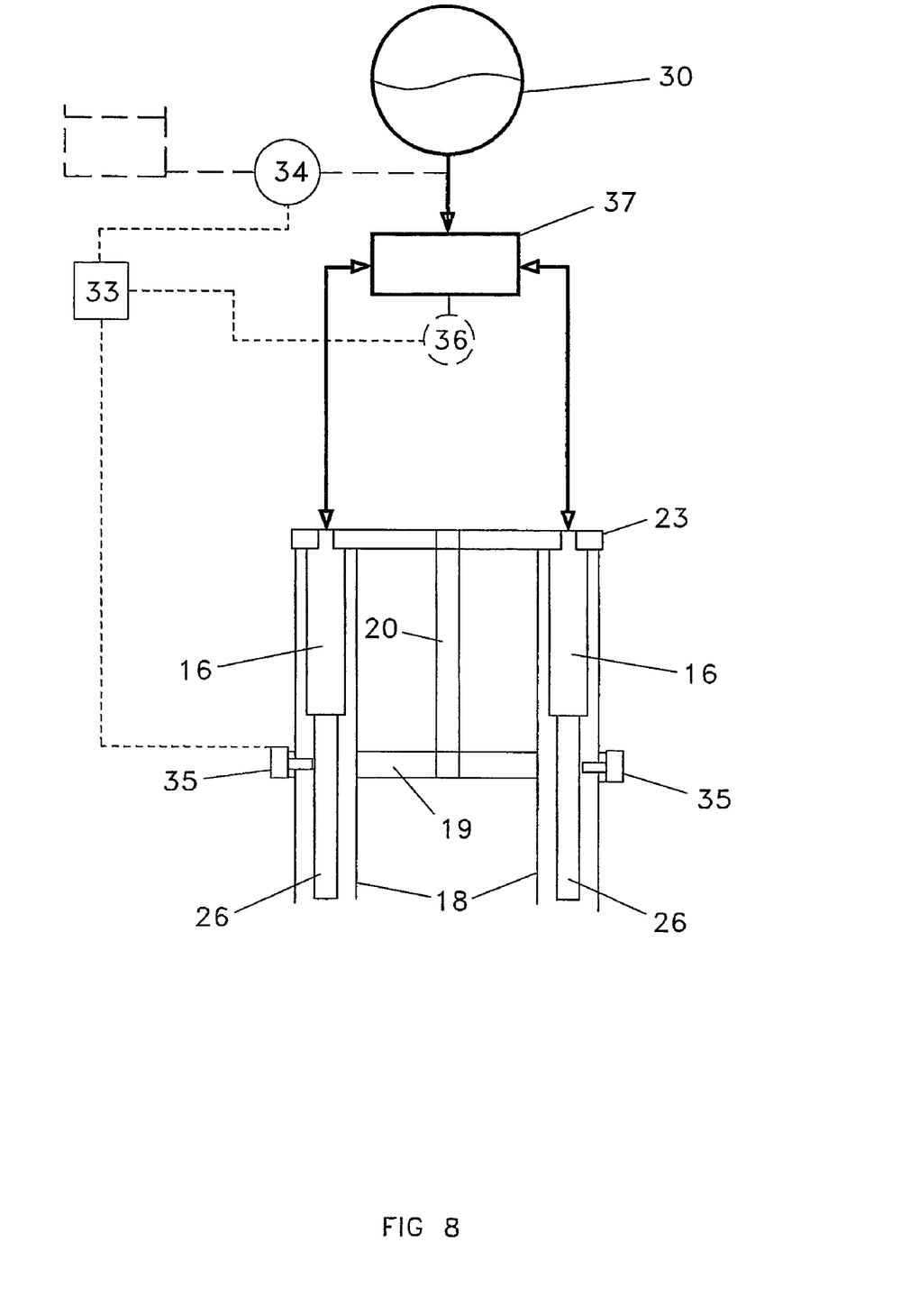

Referring to FIG. 8. Which shows a similar arrangement to that in FIG. 7 with items 31 and 32 combined in one unit.

The invention claimed is:

1. A suspension arrangement for a wheel of a vehicle comprising:
   upper and lower links of equal pivotal length displaced from each other and rotatably attached to a chassis or body of the vehicle at first ends to respective upper and lower chassis attachment points separated by a first spacing; and
   an axle support link locating a wheel axle at an axle end of the axle support link and attached at a link end of the axle support link to second ends of the upper and lower links by link attachment points separated by a second spacing, in which the first spacing is double the second spacing, and a centre distance between the wheel axle and each of the link attachment points is the same as the length of the upper and lower links, such that the geometry of said arrangement constrains movement of the axle and wheel rectilinearly between the chassis attachment points and the angular displacement of the axle support link focuses to an axis or centre point exhibiting rectilinear displacement at 90° to that of the wheel.

2. A suspension arrangement according to claim 1, in which the upper and lower chassis attachment points are horizontally off-set from the link attachment points such that the upper and lower links have horizontally off-set pivotal centres; and in which the wheel axle comprises a stub axle protruding from a first side of the axle support link; and further comprising an additional link compliantly attached at one end to a second side of the axle support link inline with the axle centre line, and passing between the upper and lower link attachments to an opposite end attached to a torsion bar or tube having an axis coincident with the centre point.

3. A suspension arrangement according to claim 1, in which the links pass through a leg via a slot and the upper and lower links are attached to projections on either side of the slot with the axle and axle support link moving between the projections and wherein the sides of the slot provide additional lateral stability and guidance to the links and wheel mounted thereon, said leg is inclined from the vertical to provide rake and trail and is attached to the chassis by pivotal connections at each end of the leg for steering the vehicle.

4. A suspension arrangement according to claim 1, in which a leg is extended above the upper link and is provided with upper and lower off-set yolks for attachment to the chassis of a single track vehicle via a pivotal connection positioned above and over the front wheel to provide steering, and wherein the arrangement may be duplicated at either side of the wheel using symmetrical upper and lower yolks to provide additional stability.

5. A suspension arrangement according to claim 1, further comprising a disc brake for stopping the vehicle, wherein a caliper of said disc brake is secured to the axle link and positioned such that the reactions on retardation of the vehicle are substantially balanced.

6. An arrangement according to claim 4, wherein a geared torsion bar or bars are rotatably attached to the lower yolk and the gears mesh with mating racks cut into reciprocating means located within hollowed legs via communicating penetrations and said reciprocating means are restrained by springs at their upper end and attached to the axle links via pivotal connections at their lower end to provide the suspension.

7. A suspension arrangement according to claim 6, further including independent springing and/or damping means comprising at least one damper that varies with velocity, to vary the resistance and control the bump and rebound motion of the wheel attached thereto.

8. A suspension arrangement according to claim 1, which includes hydraulic struts coupled to a common gas/oil accumulator via a 50:50 flow divider/re-combiner which functions irrespective of load and pressure to maintain simultaneous and parallel movement of the struts.

9. A suspension arrangement according to claim 1, further including independent dampers with velocity/positional sensors, connected to a CPU with a means to control and vary a flow of fluid through the dampers to maintain alignment.

10. A suspension arrangement according to claim 1, further including independently adjustable damping integrated with a 50:50 flow divider/re-combiner.

11. A suspension arrangement according to claim 1, further including external means for independent adjustment of the spring rate, bump and rebound damping characteristics.

12. Suspension arrangements for single-track vehicles of other designs which subsequent to this disclosure incorporate part or all of the features, claimed in claim 1, to improve their performance.

* * * * *